(12) United States Patent
Hase et al.

(10) Patent No.: US 6,200,679 B1
(45) Date of Patent: Mar. 13, 2001

(54) FLAME-RESISTANT FLEXIBLE RESIN COMPOSITIONS FOR ELECTRICAL CABLE COATINGS

(75) Inventors: Tatsuya Hase; Yoshiaki Yamano; Shinichi Matsumoto; Ryou Senoo, all of Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/412,507

(22) Filed: Oct. 5, 1999

(30) Foreign Application Priority Data

Oct. 6, 1998 (JP) .................................................. 10-284376

(51) Int. Cl.[7] .............................. B32B 15/00; H01B 7/00; C08L 23/00
(52) U.S. Cl. ........................ 428/379; 428/372; 428/375; 174/110 PM; 174/110 SR; 174/121 A; 525/240
(58) Field of Search .......................... 525/240; 428/372, 428/379; 174/110 PM, 110 SR, 121 A

(56) References Cited

U.S. PATENT DOCUMENTS

| | | | |
|---|---|---|---|
| 3,758,643 | * | 9/1973 | Fischer ................................ 260/897 A |
| 3,821,333 | * | 6/1974 | Goodwin et al. ................. 260/879 A |
| 3,835,201 | * | 9/1974 | Fischer ................................ 260/879 A |
| 3,862,106 | * | 1/1975 | Fischer ................................ 260/80.78 |
| 3,941,859 | * | 3/1976 | Batiuk et al. ...................... 260/879 B |
| 4,412,938 | * | 11/1983 | Kakizaki et al. .................. 252/511 |
| 5,470,902 | | 11/1995 | Kubo et al. . |
| 6,034,162 | * | 3/2000 | Miautani et al. .................. 524/437 |

FOREIGN PATENT DOCUMENTS

| | | |
|---|---|---|
| 2-195603 | 8/1990 | (JP) . |
| 10199201 | 7/1998 | (JP) . |
| 10340627 | 12/1998 | (JP) . |

OTHER PUBLICATIONS

English language abstract of JP 2–195603. Undated.

* cited by examiner

Primary Examiner—William Krynski
Assistant Examiner—J. M. Gray
(74) Attorney, Agent, or Firm—Greenblum & Bernstein, P.L.C.

(57) ABSTRACT

Flame-resistant resin composition is prepared for use as a coating material and applied to electrical cables. The resin composition is not cross-linked, and contains no halogen. It is highly formable, flexible, heat-resistant and oil proof. The flame-resistant flexible resin composition includes 100 parts by weight of polymeric material including about 50 to 90 parts by weight of thermoplastic elastomer copolymer including polyolefin and rubber, about 5 to 25 parts by weight of a second copolymer including ethylene and vinyl-based compound containing at least one carbonyl group, and up to about 25 parts by weight of polyolefin having a crystallinity of at least about 55%, and about 30 to 200 parts by weight of at least one metal hydroxide a surface of which has not been treated with stearic acid.

24 Claims, 1 Drawing Sheet

FLAME-RESISTANT FLEXIBLE RESIN COMPOSITIONS FOR ELECTRICAL CABLE COATINGS

BACKGROUND OF THE INVENTION

1. Field of the Invention

The present invention relates to flame-resistant flexible resin compositions used for coatings, which do not generate halogen-type noxious gases even when accidentally burned. The resin compositions of the invention are in particular suitable for use as coatings for electrical cables, especially as substantially thick coatings for electrical cables. The invention also relates to electrical cables that use such resin compositions as fire-proof coatings.

2. Description of the Background Information

Poly(vinyl chloride), also known as PVC is commonly used as an insulating coating material for electrical cables. The reason for this preferential use is that PVC satisfies the prerequisites for coating materials, such as high electrical insulation, flame resistance, oil-proofing, water-proofing and ozone resistance. Further, by blending with appropriate additives such as a plasticizer or a filler, PVC can easily provide a wide spectrum of products, depending on the purpose, ranging from heat-proof to cold-proof, or from hard products to soft products.

However, PVC suffers from the fact that it is a halogen-containing polymer. When PVC is burned accidentally, it generates noxious gases such as hydrogen chloride. Accordingly, when an electrical cable containing PVC is set on fire, hydrogen chloride gas is generated from the PVC and may cause secondary damages such as corrosion of the metals used for wiring.

Moreover, in our environmentally conscious age, it has become necessary to reduce or recycle industrial wastes such as plastic materials. As is well known, PVC is already used for coating automobile wiring-harness cables. However, the hydrogen chloride gas generated from PVC when incinerated has recently caused serious damage. As a result, it is now required to use halogen-free-type, flame-resistant coating materials that do not generate toxic gases such as hydrogen halide gas.

Typical halogen-free-type flame-resistant materials include a mixture consisting of a polyolefin resin, and a metal hydroxide as a halogen-free flame-resistant agent. However, electrical cables obtained by coating with known halogen-free type flame-resistant materials are less flexible and less resilient, in comparison with PVC-based products. Moreover, in order to guarantee flame resistance, a considerable amount of metal hydroxide has to be added to the flame-resistant materials. Now, an increase in the amount of added flame-resistant agents (flame retardants), is to the detriment of mechanical strength of the product, such as wear resistance or tensile strength.

In order to confer wear resistance to such halogen-free materials, the latter may be hardened, or coatings with these materials may be made thicker. For instance, an electrical cable can be given a thick coating with a layer thickness of 0.5 to 0.8 mm, so that, even if wear resistance is decreased by addition of a metal hydroxide, the risk of wearing away the coating remains small. The conductive portion of the electrical cable may thus be protected from possible exposure.

However, when a coating containing such a hard material is thickened, the coated electrical cable becomes too hard, and makes the wiring process more difficult. It thus appears that to solve these problems, an electrical cable should first be coated thickly with a flexible material. Examples of appropriate materials include ethylene-vinyl acetate copolymer (EVA), ethylene-ethylacrylate copolymer, and the like. They can be used alone or in a mixture.

However, such flexible materials usually have a very low melting point, poor heat resistance and poor oil proofing capacity. They are thus unsuitable as a coating material for electrical cables used in oily environments such as in automobiles. To remedy these shortcomings, such materials may be cross-linked by electron beams, or through chemical treatments such as vulcanization.

However, to cross-link the coatings of an elongate electrical cable, large scale equipment is required, both for electron beam irradiation and for vulcanization treatment. This means that the productivity of electrical cable manufacture is lowered and the production has to be entrusted to a specialized manufacturer. Accordingly, there exists a strong need for non-cross-linked coating materials which are oil- and heat-proof, and highly flexible.

In order to ensure high heat resistance without proceeding to cross-linking, polypropylene having a relatively high melting point may be blended with high-density polyethylene. However, the blending of these two polymers impairs flexibility. Further, electrical cables have to be subjected to end portion conditioning in later stages. As illustrated in FIG. 1, when an end of a cable is peeled off or stripped of the insulating coatings made of such polymers in such a conditioning process, there forms a cut-out face after the coating 1 that is partially chipped away. Such a cut-out face leaves behind whisker-like trails 2 of insulating coating 1 (hereafter referred to as whiskers) along a conductive portion 3. This gives rise to the so-called "necking" phenomenon. When the conductive portion 3 with such whiskers 2 is forcibly connected to a terminal, the whiskers get caught between the conductive portion 3 and the terminal. As a result, contact resistance increases and conductivity deteriorates. Accordingly, when the above-mentioned polymer mixture is used, its whisker-trailing effect due to low formability creates problems.

SUMMARY OF THE INVENTION

The present invention has therefore a primary object to remedy these shortcomings of the prior art, and to provide a non cross-linked resin composition containing no halogen, which has a good formability, flexibility, heat resistance and oil-proofing, as well as to provide an electrical cable coated with such a resin composition.

To this end, there is provided a flame-resistant flexible resin composition at least comprising 100 parts by weight of polymeric material comprising about 50 to 90 parts by weight of thermoplastic elastomer copolymer comprising polyolefin and rubber, about 5 to 25 parts by weight of a second copolymer comprising ethylene and vinyl-based compound containing at least one carbonyl group, and up to about 25 parts by weight of polyolefin having a crystallinity of at least about 55%, and about 30 to 200 parts by weight of at least one metal hydroxide a surface of which has not been treated with stearic acid.

Preferably, the thermoplastic elastomer comprising polyolefin and rubber has a melting point of at least about 130° C. and a JIS-A hardness of up to about 90.

Preferably also, the copolymer comprising ethylene and vinyl-based compound containing at least one carbonyl group is at least one compound selected from the group consisting of ethylene-vinyl acetate copolymer, ethylene-acrylate copolymer and ethylene-methacrylate copolymer.

The polyolefin having a crystallinity of at least about 55% is preferably high density polyethylene or polypropylene.

The electrical cable according to the present invention utilizes the above-mentioned flame-resistant resin composition as a coating material. Preferably, the coating is about 0.5 to 0.8 mm thick.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1:
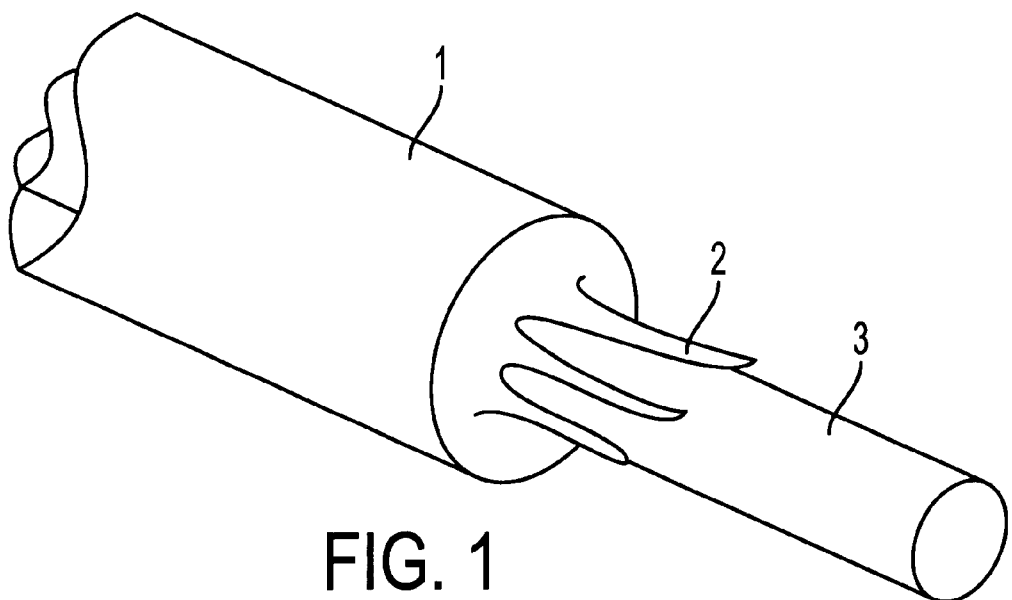
FIG. 1 is a view illustrating the formation of coating whiskers when the coating is stripped off the electrical cable.

The polymeric material used in the flame-resistant resin composition of the invention comprises a thermoplastic elastomer copolymer comprising polyolefin and rubber; a second copolymer comprising ethylene and vinyl-based compound containing at least one carbonyl group, and a polyolefin having a crystallinity of at least about 55%. The flame-resistant resin composition further comprises at least one metal hydroxide as a flame-resistant agent.

The thermoplastic elastomer copolymer comprising polyolefin and rubber according to the present invention is preferably a block copolymer which comprises polyolefin as a hard segment (H) and rubber as a soft segment (S). This elastomer confers flexibility to the coating.

Typical polyolefins used as the hard segment (H) include polyethylene and polypropylene, and typical rubbers used as the soft segment (S) include an ethylene propylene binary copolymer (EPR), an ethylene propylene diene terpolymer (EPDM), butadiene and isoprene. The block copolymer may be either a di-block type H-S, a tri-block type H-S-H, a multi-block type (H-S)n or a star type.

Typical elastomer copolymers used in the present invention include PE-EPR, PE-EPDM, PP-EPR, PP-EPDM, PE-polybutadiene, PE-polyisoprene and PP-polybutadiene elastomers. They may be used alone or in a mixture of at least two elastomers.

Among the above-mentioned thermoplastic elastomers, elastomers having a JIS-A hardness of up to about 90 are preferably used in the present resin composition. When the JIS-A hardness exceeds about 90, the elastomer does not confer sufficient flexibility to the coatings. JIS-A hardness is measured by using a Spring-type Hardness Test Machine A, defined in JIS K6301 Standards. Even when two thermoplastic elastomers are composed of the same hard segment and the same soft segment, JIS-A hardness may be differentiated by changing the proportion of hard segment to soft segment. JIS-A hardness may also be differentiated by selecting the molecular weight (degree of polymerization) of each segment.

The melting point of the thermoplastic polyolefin-rubber elastomer copolymer according to the invention is preferably at least about 130° C. When it is less than about 130° C., heat resistance of the coating is too low.

Such a thermoplastic polyolefin-rubber elastomer copolymer accounts for about 50 to 90% by weight of the polymeric material. When its amount is less than about 50% by weight, the coating is not sufficiently flexible. When its amount exceeds about 90% by weight, the formability of the coating is poor. As a result, when end or middle portions of the electrical cable are stripped off their coatings, necking occurs, giving rise to coating whiskers.

The addition of thermoplastic elastomer copolymer thus confers flexibility to the coatings, but lowers their formability. The addition of the second copolymer comprising ethylene and vinyl-based compound containing at least one carbonyl group can compensate this lowered formability. Examples of such a copolymer include an ethylene-acrylate copolymer such as ethylene-methyl acrylate copolymer or ethylene-ethyl acrylate copolymer, an ethylene-methacrylate copolymer such as ethylene-methyl methacrylate copolymer or ethylene-ethyl methacrylate copolymer, and ethylene-vinyl acetate copolymer (EVA).

The second copolymer comprising ethylene and vinyl-based compound containing at least one carbonyl group accounts for about 5 to 25% by weight of the polymeric material. When its amount is less than about 5% by weight, the formability of the coatings is insufficiently improved. Conversely, when its amount is in excess of about 25% by weight, oil-proofing of the coatings is insufficient.

Addition of the copolymer comprising ethylene and vinyl-based compound containing at least one carbonyl group thus tends to lower the oil-proofing property of the coatings. Conversely, polyolefins having a crystallinity of at least about 55% have a good oil-proofing property. Addition of the latter thus compensates the lowering of the oil-proofing property of the coatings. Examples of such polyolefins include high density polyethylene (crystallinity of about 65 to 90%) and isotactic polypropylene (crystallinity of about 60%).

A polyolefin having high crystallinity usually hardens the product to which it is added. Such polyolefins account for up to about 25% by weight of the polymeric material of the present invention. When its amount is in excess of about 25% by weight, flexibility of the coatings is impaired.

In the present application, crystallinity is measured by the density method. In this method, the density of the specimen is measured using a density-gradient tube and crystallinity is calculated by the following equation:

$$\text{crystallinity (\%)} = [(d-d_a)/(d_c-d_a)] \cdot (d_c/d) \cdot 100$$

where d=density of specimen $d_a$=density of non-crystallized material $d_c$=density of fully crystallized material In addition to the polymeric material, the resin composition of the present invention comprises metal hydroxides as flame-resistant agents. Typical metal hydroxides include magnesium hydroxide and aluminum hydroxide. However, when added massively, these metal hydroxides deteriorate the physical properties of the base polymer, in particular its tensile strength, elongation and flexibility. Accordingly, metal hydroxide is added in an amount of about 30 to 200 parts by weight, relative to 100 parts by weight of the polymeric material.

In order to raise mechanical strength, the surface of heat-resistant metal hydroxides may be treated, prior to use, with a surface-treatment agent. However, this treatment deteriorates the formability of the product. For instance, coatings containing a metal hydroxide whose surface is treated with higher fatty acids, especially stearic acid, are likely to cause necking. Therefore, the metal hydroxides used in the invention are not usually treated with these surface-treatment agents.

The resin composition of the invention further comprises, where necessary, anti-oxidants, copper-pollution preventing agents, colorants, lubricants or similar compounds. However, additions of these compounds should be limited to a certain level so as not to deteriorate the physical properties necessary for use as cable coatings, i.e., flexibility, formability, flame resistance, oil proofing, tensile strength and elongation.

The resin composition prepared as described above is suitable for use as electrical cable insulating coatings, in particular insulating coatings as thick as about 0.5 to 0.8 mm. An electrical cable coated with such a resin composition is oil proof, flexible in spite of its thickness, and easy to use for wiring. It also has good formability so that when a coated cable is subjected to an end portion conditioning or a middle-zone preparation for external connection, corresponding portions of the coatings must be stripped off. When a classically coated cable is used, such a stripping process creates coating whiskers. By comparison, an electrical cable coated with the inventive resin composition avoids such whiskers.

As described above, the electrical cable of the invention is coated with the resin composition according to the present invention. Coatings are prepared from the inventive resin composition, without passing through the cross-linking steps. Notwithstanding, the cable coatings according to the invention are secure as regards the necessary oil proofing and heat resistance. As its coating is flexible, the inventive electrical cable is well adapted for a heavy coating as thick as about 0.5 to 0.8 mm. Accordingly, the present cable is particularly suitable for electrical cabling in automobiles.

EXAMPLES

[Evaluation Method]

Evaluation methods of the examples of the present invention are described hereinafter.

1) Flame resistance

The flame resistance is assessed by Horizontal Burning Tests according to JASO D611 Standards.

Figure 2:
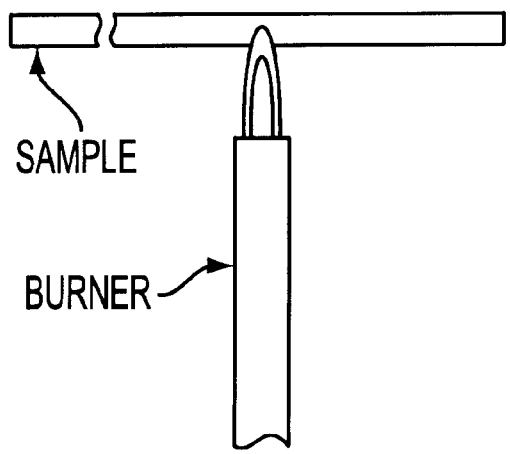
FIG. 2 is a view illustrating a flame-resistance testing method.

A Bunsen burner having a nozzle diameter of about 10 mm is adjusted so as to obtain a reducing flame length of about 35 mm. A test sample is kept horizontal as shown in FIG. 2. The middle zone of the test sample is heated by the flame from underside of the sample, such that the test sample lights up within 30 seconds. The flame is then removed, and the time elapsed before the lit-up flame fades away is counted. When this time is equal to, or less than, 15 seconds, flame resistance is considered to be good and denoted with a "O" in TABLE II. Otherwise, the result is denoted with an "X".

2) Tensile strength (MPa)

The tensile strength is measured by tensile tests of insulating materials according to JASO D611 Standards.

A dumbbell type or tubular test sample is prepared. The test sample is drawn from both ends of the test sample by a Pendulum Tensile Test Machine at a speed of 300 mm/min (in the case of dumbbell type test samples) or 500 mm/min (in the case of tubular test samples), and the load at breaking point is measured. When the load is in excess of 15.7 MPa, the test sample has a good tensile strength, and is denoted with an "O" in TABLE II. Otherwise, the result is denoted with an "X". For use as an electrical cable, the material of the test sample should have a tensile strength of at least 15.7 MPa.

3) Elongation (%)

In the tensile test mentioned above, the elongation of the broken test sample is measured, and elongation rates (%) with regard to the initial sample length are calculated. Satisfactory results are denoted with an "O". Otherwise, the results are denoted with an "X".

4) Oil proofing

A coating sample is dipped in engine oil at 70° C. After 24 hours, the sample is withdrawn from the oil and allowed to stand for natural cooling. When the sample's tensile strength or elongation after dipping, compared to what it was before dipping, is altered by an amount less than or equal to 40%, a mark "O" is given. When the alteration exceeds 40%, a mark "X" is given.

5) Flexibility

Flexibility is estimated by "hand" feeling when a cable sample is flexed. When the flexibility is felt sufficiently upon flexing, the result is denoted with an "O", otherwise it is denoted with an "X".

6) Formability

A coated cable is stripped off its coatings at a middle portion along its length, and the formation of coating whiskers is observed with the naked eye. When whiskers are not formed, an "O" mark is given, and when they are formed, an "X" mark is given.

[Preparation of electrical cables]

A conductive wire is prepared by twisting 65 soft copper threads, each having a diameter of 0.32 mm, to obtain a cross-section of 5 $mm_2$. A flame-resistant resin composition is extruded on the wire surface, so as to form a coating of 0.7 mm thickness. The resin compositions each contain the constituent parts as shown in TABLE I. In these resin compositions, components of the polymeric material part and magnesium hydroxide part (a flame-resistant agent) are varied in amounts as shown in TABLE II. Extrusion is carried out at a die temperature of 210° C., a cylinder temperature of 200° C. and a line speed of 50 m/min. Electrical cable Samples 1 to 12 thus prepared have coatings including different components. Among them, Samples 1 and 2 correspond to the examples according to the present invention, whereas Samples 3 to 12 correspond to comparative examples.

TABLE I

| Constituent Parts | Amounts by weight |
|---|---|
| Polymeric material | 100 |
| Magnesium hydroxide | Variable |
| Anti-aging agents | 1 |
| Zinc stearate | 0.3 |
| Calcium stearate | 0.3 |

The thermoplastic polyolefin-rubber elastomer copolymer used is "P.E.R.T 310 J" produced by Kabushiki Kaisha Tokuyama (Tokuyama Corp.), which corresponds to polypropylene-EPR having a JIS-A hardness of 90, and "NEWCON NB 2100" produced by Chisso Corporation, which corresponds to polypropylene-EPR having a JIS-A hardness of 95. These products differ by JIS-A hardness due to different propylene contents. The anti-aging agent used is "Tominox TT" which is a phenol-type product produced by YOSHITOMI FINECHEMICALS, LTD.

The electrical cables thus prepared are each subjected to the tests concerning flame resistance, oil proofing, flexibility, tensile strength, elongation and formability according to the evaluation methods described above. The results obtained are shown in TABLE II, together with the amounts of components included in the resin compositions.

TABLE II

| Samples | 1 | 2 | 3 | 4 | 5 | 6 | 7 | 8 | 9 | 10 | 11 | 12 |
|---|---|---|---|---|---|---|---|---|---|---|---|---|
| Elastomer | | | | | | | | | | | | |
| PP-EPR (90)[1] | 60 | 50 | 60 | 60 | 100 | 60 | 40 | 50 | 50 | 60 | 80 | — |
| PP-EPR (95)[1] | — | — | — | — | — | — | — | — | — | — | — | 60 |
| Polyolefin | | | | | | | | | | | | |
| PP(60)[2] | 20 | — | 30 | — | — | — | — | 25 | 25 | 20 | 20 | — |
| High Density PE (70)[2] | — | 25 | — | — | — | — | 30 | — | — | — | — | 20 |
| Low Density PE (50)[2] | — | — | — | — | — | 20 | — | — | — | — | — | — |
| E-VA | 20 | 25 | 10 | 40 | — | 20 | 30 | 25 | 25 | 20 | — | 20 |
| $Mg(OH)_2$ | | | | | | | | | | | | |
| Non-treated | 100 | 150 | 100 | 100 | 100 | 150 | 100 | — | 20 | 250 | 100 | 100 |
| Treated with stearic acid | — | — | — | — | — | — | — | 100 | — | — | — | — |
| Evaluation | | | | | | | | | | | | |
| Flame resistance | O | O | O | O | O | O | O | O | X | O | O | O |
| Oil proofing | O | O | O | X | O | X | X | O | O | O | O | O |
| Flexibility | O | O | X | O | O | O | X | O | O | X | O | X |
| Tensile strength | O | O | O | O | O | O | O | O | O | O | O | O |
| Elongation | O | O | O | O | O | O | O | O | O | X | O | O |
| Formability | O | O | O | O | X | O | O | X | O | O | X | O |

1) JIS-A hardness
2) Crystallinity

By comparing the results obtained with Samples 1 and 3, it can be concluded that when a higher amount of polypropylene having a high crystallinity is used, the resulting product becomes less flexible. Conversely, Sample 4 indicates that when the product does not contain highly crystalline polyolefin, but contains proportionally high EVA portion, flexibility is satisfactory, but the oil proof property is not sufficient. Further, comparison of the results from Samples 1 and 6 indicates that even when the product contains an appropriate amount of polyolefin, its oil proof property is typically not satisfactory if the polyolefin has a crystallinity of about 50%.

By comparing the results from Samples 1 and 12, it can be concluded that when an elastomer having a hardness of about 95 is used, the resulting product typically lacks flexibility. Consequently, in order to secure flexibility, the elastomer preferably has a hardness of less than about 95, more preferably less than about 90.

According to the results from Sample 5, the elastomers, when used alone, fulfill the prerequisite conditions for oil proofing, flexibility, tensile strength and elongation, but not for formability. According to Sample 11, when an elastomer and a polyolefin are combined, oil proofing, flexibility, tensile strength and elongation are satisfied even if EVA is not contained, but not formability. According to Sample 7, when the elastomer accounts for less than about 50% by weight of the polymeric material, the resulting product is not flexible enough. Further, when EVA content is in excess of about 25% by weight of the polymeric material, the product is not sufficiently oil proof.

On the basis of the results from Sample 9, the content of flame-resistant agents should not be too low. However, as seen from Sample 10, when the content exceeds about 200 parts by weight, mechanical characteristics such as elongation and flexibility deteriorate.

According to the results from Sample 8, when the surface the flame-resistant agent of magnesium hydroxide is treated with stearic acid, the formability of the resulting product is lowered.

The flame-resistant resin composition according to the invention contains no halogen for flame prevention, so that it is environment-friendly. The resin composition is oil proof and flexible without being cross-linked. The inventive resin composition is therefore suitable for coatings requiring such features.

The electrical cable using such a resin composition is also environment-friendly, flame-resistant, oil proof, and has high mechanical strength. Flexibility is maintained even when the electrical cable is sized up and its coating made thicker. The wiring process can thus be facilitated. Moreover, end portion conditioning and middle-length preparation of the electrical cable are easily performed.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. HEI 10-284376, filed on Oct. 6, 1998, which is herein expressly incorporated by reference in its entirety.

What is claimed is:

1. A flame-resistant flexible resin composition, comprising:
    100 parts by weight of polymeric material comprising:
        about 50 to 90 parts by weight of thermoplastic elastomer copolymer comprising polyolefin and rubber,
        about 5 to 25 parts by weight of a second copolymer comprising ethylene and vinyl-based compound containing at least one carbonyl group, and
        up to about 25 parts by weight of polyolefin having a crystallinity of at least about 55%; and
    about 30 to 200 parts by weight of at least one metal hydroxide a surface of which has not been treated with stearic acid.

2. The flame-resistant resin composition according to claim 1, wherein said thermoplastic elastomer copolymer comprising polyolefin and rubber has a melting point of at least about 130° C. and a JIS-A hardness of up to about 90.

3. The flame-resistant resin composition according to claim 2, wherein said second copolymer comprising ethylene and vinyl-based compound containing at least one carbonyl group comprises at least one of ethylene-vinyl acetate copolymer, ethylene-acrylate copolymer, and ethylene-methacrylate copolymer.

4. The flame-resistant resin composition according to claim 3, wherein said polyolefin having a crystallinity of at least about 55% comprises one of high density polyethylene and polypropylene.

5. The flame-resistant resin composition according to claim 2, wherein said polyolefin having a crystallinity of at least about 55% comprises one of high density polyethylene and polypropylene.

6. The flame-resistant resin composition according to claim 1, wherein said second copolymer comprising ethylene and vinyl-based compound containing at least one carbonyl group comprises at least one of ethylene-vinyl acetate copolymer, ethylene-acrylate copolymer, and ethylene-methacrylate copolymer.

7. The flame-resistant resin composition according to claim 6, wherein said polyolefin having a crystallinity of at least about 55% comprises one of high density polyethylene and polypropylene.

8. The flame-resistant resin composition according to claim 1, wherein said polyolefin having a crystallinity of at least about 55% comprises one of high density polyethylene and polypropylene.

9. The flame-resistant resin composition according to claim 1, wherein the polymeric material comprises no halogen.

10. The flame-resistant resin composition according to claim 1, wherein the polymeric material is not cross-linked.

11. An electrical cable comprising a flame-resistant resin composition as a coating, said flame-resistant flexible resin composition, comprising:
    100 parts by weight of polymeric material comprising:
        about 50 to 90 parts by weight of thermoplastic elastomer copolymer comprising polyolefin and rubber,
        about 5 to 25 parts by weight of a second copolymer comprising ethylene and vinyl-based compound containing at least one carbonyl group, and
        up to about 25 parts by weight of polyolefin having a crystallinity of at least about 55%; and
    about 30 to 200 parts by weight of at least one metal hydroxide a surface of which has not been treated with stearic acid.

12. The electrical cable according to claim 11, wherein said thermoplastic elastomer copolymer comprising polyolefin and rubber has a melting point of at least about 130° C. and a JIS-A hardness of up to about 90.

13. The electrical cable according to claim 12, wherein said second copolymer comprising ethylene and vinyl-based compound containing at least one carbonyl group comprises at least one of ethylene-vinyl acetate copolymer, ethylene-acrylate copolymer, and ethylene- methacrylate copolymer.

14. The electrical cable according to claim 13, wherein said polyolefin having a crystallinity of at least about 55% comprises one of high density polyethylene and polypropylene.

15. The electrical cable according to claim 14, wherein said coating is about 0.5 to 0.8 mm thick.

16. The electrical cable according to claim 13, wherein said coating is about 0.5 to 0.8 mm thick.

17. The electrical cable according to claim 12, wherein said polyolefin having a crystallinity of at least about 55% comprises one of high density polyethylene and polypropylene.

18. The electrical cable according to claim 12, wherein said coating is about 0.5 to 0.8 mm thick.

19. The electrical cable according to claim 11, wherein said second copolymer comprising ethylene and vinyl-based compound containing at least one carbonyl group comprises at least one of ethylene-vinyl acetate copolymer, ethylene-acrylate copolymer, and ethylene- methacrylate copolymer.

20. The electrical cable according to claim 19, wherein said polyolefin having a crystallinity of at least about 55% comprises one of high density polyethylene and polypropylene.

21. The electrical cable according to claim 11, wherein said polyolefin having a crystallinity of at least about 55% comprises one of high density polyethylene and polypropylene.

22. The electrical cable according to claim 11, wherein said coating is about 0.5 to 0.8 mm thick.

23. The electrical cable according to claim 11, wherein the polymeric material comprises no halogen.

24. The electrical cable according to claim 11, wherein the polymeric material is not cross-linked.

* * * * *